(12) United States Patent
Kanbe et al.

(10) Patent No.: US 8,018,665 B2
(45) Date of Patent: Sep. 13, 2011

(54) LENS MOVING FRAME AND LENS DEVICE

(75) Inventors: Takao Kanbe, Saitama (JP); Shinobu Ono, Saitama (JP); Shinichiro Harada, Saitama (JP); Satoru Nemoto, Saitama (JP)

(73) Assignee: Fujinon Corporation, Saitama (JP)

( * ) Notice: Subject to any disclaimer, the term of this patent is extended or adjusted under 35 U.S.C. 154(b) by 25 days.

(21) Appl. No.: 12/541,512

(22) Filed: Aug. 14, 2009

(65) Prior Publication Data

US 2010/0073784 A1 Mar. 25, 2010

(30) Foreign Application Priority Data

Sep. 22, 2008 (JP) ................................ P2008-242584

(51) Int. Cl.
*G02B 7/02* (2006.01)
(52) U.S. Cl. .................... 359/823; 359/819; 359/822
(58) Field of Classification Search .................. 359/826, 359/811–824
See application file for complete search history.

(56) References Cited

U.S. PATENT DOCUMENTS

2007/0206934 A1* 9/2007 Ishii et al. ................... 396/55

FOREIGN PATENT DOCUMENTS

| CN | 1782166 A | 6/2006 |
|----|-----------|--------|
| JP | 8-82320 A | 3/1996 |
| JP | 2003-344746 A | 12/2003 |

* cited by examiner

*Primary Examiner* — Mohammed Hasan
(74) *Attorney, Agent, or Firm* — Birch, Stewart, Kolasch & Birch, LLP.

(57) ABSTRACT

A lens moving frame according to an embodiment of the invention includes a holder portion. The holder portion includes: wall portions having guide holes formed therein; partition walls into which a guide bar is inserted and which are provided near the corresponding wall portions; and lubricant reservoir portions that are provided between the partition walls and the wall portions and have a lubricant filled and stored therein. The lubricant stored in the lubricant reservoir portion is adhered to the guide bar disposed between the partition wall and the wall portion. When the lens moving frame is moved along the guide bar, an extra lubricant is scraped off from the guide bar by the guide holes and opening portions of the partition walls and then stored in the lubricant reservoir portions.

5 Claims, 5 Drawing Sheets

LENS MOVING FRAME AND LENS DEVICE

CROSS-REFERENCE TO RELATED APPLICATIONS

This application is based upon and claims the benefit of priority from the Japanese Patent Application No. 2008-242584 filed on Sep. 22, 2008; the entire contents of which are incorporated herein by reference.

BACKGROUND OF THE INVENTION

1. Field of the Invention

The present invention relates to a lens moving frame and a lens device, and more particularly, to a lens moving frame that includes a holding portion holding a lens and guide holes through which a guide bar is inserted and is supported so as to be movable along the guide bar in an imaging optical axis direction, and a lens device.

2. Description of the Related Art

JP-A-2003-344746 discloses a lens barrel in which a lens moving frame has a holding portion holding a lens and a guide hole through which a guide bar is inserted formed therein and is supported so as to be movable along the guide bar in an imaging optical axis direction.

In addition, in JP-A-2003-344746, a lubricant is applied to the guide bar in advance in order to smoothly move the lens moving frame along the guide bar. Further, in JP-A-2003-344746, the guide hole is formed in a shape capable of preventing the lubricant applied to the guide bar from being scraped off by the guide hole when the guide bar having a circular shape in a cross-sectional view is inserted into a first guide hole (a guide hole of the main barrel). The guide hole is formed in, for example, a rectangular shape such that the guide bar is supported in the horizontal and vertical directions. Therefore, a gap is formed between the guide bar having a circular shape in cross-sectional view, and the guide hole, having a rectangular shape, and most of the lubricant applied to the guide bar is inserted through the gap to reach the lens moving frame directly. Therefore, the lens moving frame is smoothly moved by the lubricating action.

In the lens barrel disclosed in JP-A-2003-344746, the guide hole is formed in a shape capable of preventing the lubricant applied to the guide bar from being scraped off by the guide hole. Therefore, the lubrication between the guide bar and the guide hole depends on the amount of lubricant applied to the guide bar. Thus, the lens barrel disclosed in JP-A-2003-344746 has problems in that the amount of lubrication is lowered with long-term use and it is difficult to ensure the slidability of the lens moving frame for a long time.

In order to solve the above-mentioned problems, a large amount of lubricant may be applied to the guide bar. However, when a large amount of lubricant is applied, manufacturing costs increase, and the lubricant is likely to be scattered from the guide bar. In this case, the scattered lubricant is adhered to other parts, and defects occur in the parts.

SUMMARY OF THE INVENTION

The invention has been made in order to solve the above-mentioned problems, and an object of the invention is to provide a lens moving frame capable of ensuring slidability for a long time without using a large amount of lubricant, and a lens device.

In order to achieve the object, according to an aspect of the invention, there is provided a lens moving frame that is supported so as to be movable along a guide bar in an imaging optical axis direction. The lens moving frame includes: a holding portion that holds a lens; guide holes through which the guide bar is inserted; wall portions having the guide holes formed therein; partition walls through which the guide bar is inserted and which are provided near the corresponding wall portions; and lubricant reservoir portions that are formed between the partition walls and the wall portions and have a lubricant stored therein.

According to the lens moving frame of the above-mentioned aspect, the partition walls through which the guide bar is inserted are provided near the corresponding wall portions having the guide holes formed therein, and the lubricant reservoir portions are formed between the partition walls and the wall portions. In addition, the lubricant is stored in the lubricant reservoir portions. The lubricant stored in the lubricant reservoir portion is adhered to the guide bar disposed between the partition wall and the wall portion. When the lens moving frame is moved along the guide bar, any extra lubricant is scraped off from the guide bar by the guide holes and the opening portions formed in the partition walls and then stored in the lubricant reservoir portions. The amount of lubricant required to smoothly move the lens moving frame is adhered to the guide bar, and the lens moving frame is smoothly moved along the guide bar. As such, the lubricant reservoir portion formed in the lens moving frame makes it possible to effectively use the lubricant and reduce the amount of lubricant used.

As described above, in the lens moving frame according to the above-mentioned aspect of the invention, lubrication maintenance depends on the amount of lubricant stored in the lubricant reservoir portion. Therefore, it is possible to ensure the slidability of the lens moving frame for a long time, as compared to the lens moving frame disclosed in JP-A-2003-344746 in which the lubricant is merely applied to the guide bar. In addition, since an appropriate amount of lubricant is stored in the lubricant reservoir portion, it is possible to prevent an increase in manufacturing costs, and lubricant scattering does not occur. Therefore, according to the lens moving frame of the above-mentioned aspect of the invention, it is possible to ensure the slidability for a long time without using a large amount of lubricant.

In the above-mentioned aspect of the invention, the partition wall may be formed integrally with or separately from the lens moving frame. It is preferable that the partition wall and the lens moving frame be integrally made of a resin material in order to reduce manufacturing costs. In addition, the partition wall may be formed separately from the lens moving frame.

In the above-mentioned aspect of the invention, the partition wall may have a U-shape in a cross-sectional view, and the guide bar may be inserted into a concave portion of the U-shaped partition wall. It is preferable that the partition wall be formed in a substantially U-shape in a cross-sectional view and the guide bar be inserted into the concave portion of the U-shape partition wall, that is, an opening portion thereof.

In the above-mentioned aspect of the invention, the partition wall may formed in a plate shape having an opening therein, and the guide bar may be inserted into the opening of the plate-shaped partition wall. It is preferable that the partition wall be formed in a plate shape having an opening therein and the guide bar be inserted into the opening of the plate-shaped partition wall, that is, an opening portion thereof.

In order to achieve the above-mentioned object, according to another aspect of the invention, a lens device includes the above-mentioned lens moving frame.

According to the lens device of the above-mentioned aspect of the invention, it is possible to ensure the slidability of the lens moving frame for a long time without using a large amount of lubricant.

According to the lens moving frame and the lens device of the above-mentioned aspects of the invention, the partition walls through which the guide bar is inserted are provided near the corresponding wall portions having the guide holes formed therein, and the lubricant reservoir portions are formed in a bucket shape between the partition walls and the wall portions. In addition, the lubricant is stored in the lubricant reservoir portions. Therefore, it is possible to ensure slidability for a long time without using a large amount of lubricant.

DESCRIPTION OF THE PREFERRED EMBODIMENTS

Hereinafter, a lens moving frame according to an exemplary embodiment of the invention will be described with reference to the accompanying drawings.

Figure 1:
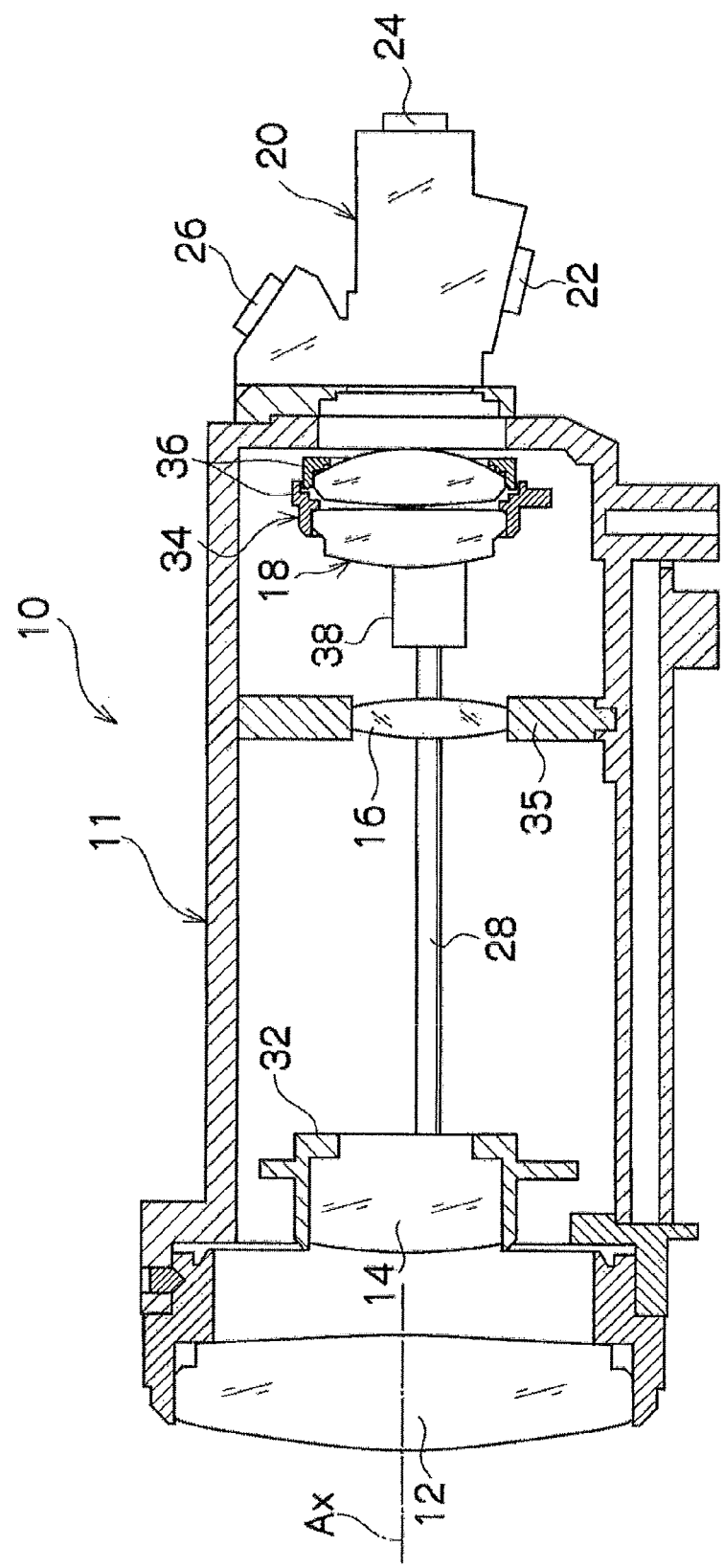
FIG. 1 is a cross-sectional view illustrating a lens device to which a lens moving frame according to an embodiment of the invention is attached.

FIG. 1 is a side cross-sectional view illustrating a lens device 10 to which a lens moving frame according to an embodiment of the invention is attached. In the lens device 10, a first lens group 12, a second lens group 14, a third lens group 16, and a fourth lens group 18 are arranged from the front side (object side) of an imaging optical axis to the rear side (imaging side) of the imaging optical axis, and object light passing through the first to fourth lens groups 12 to 18 is focused on imaging devices 22, 24, and 26 provided at the R, G, and B emission ends of a color separation prism 20 forming a color separation optical system through the color separation prism 20. In addition, a camera body (not shown) of the lens device 10 is provided with, for example, a signal processing circuit (not shown) that performs a predetermined process (for example, white balance and y correction) on image signals obtained by the imaging devices 22, 24, and 26 and generates video signals of a predetermined format.

The first lens group 12 is a so-called fixed front lens, and the second lens group 14 is a variator lens having a variable focal length. The third lens group 16 is a fixed relay lens, and the fourth lens group 18 is a focusing lens for adjusting focus. The first to fourth lens groups 12 to 18 are provided in a lens barrel body 11.

Figure 2:
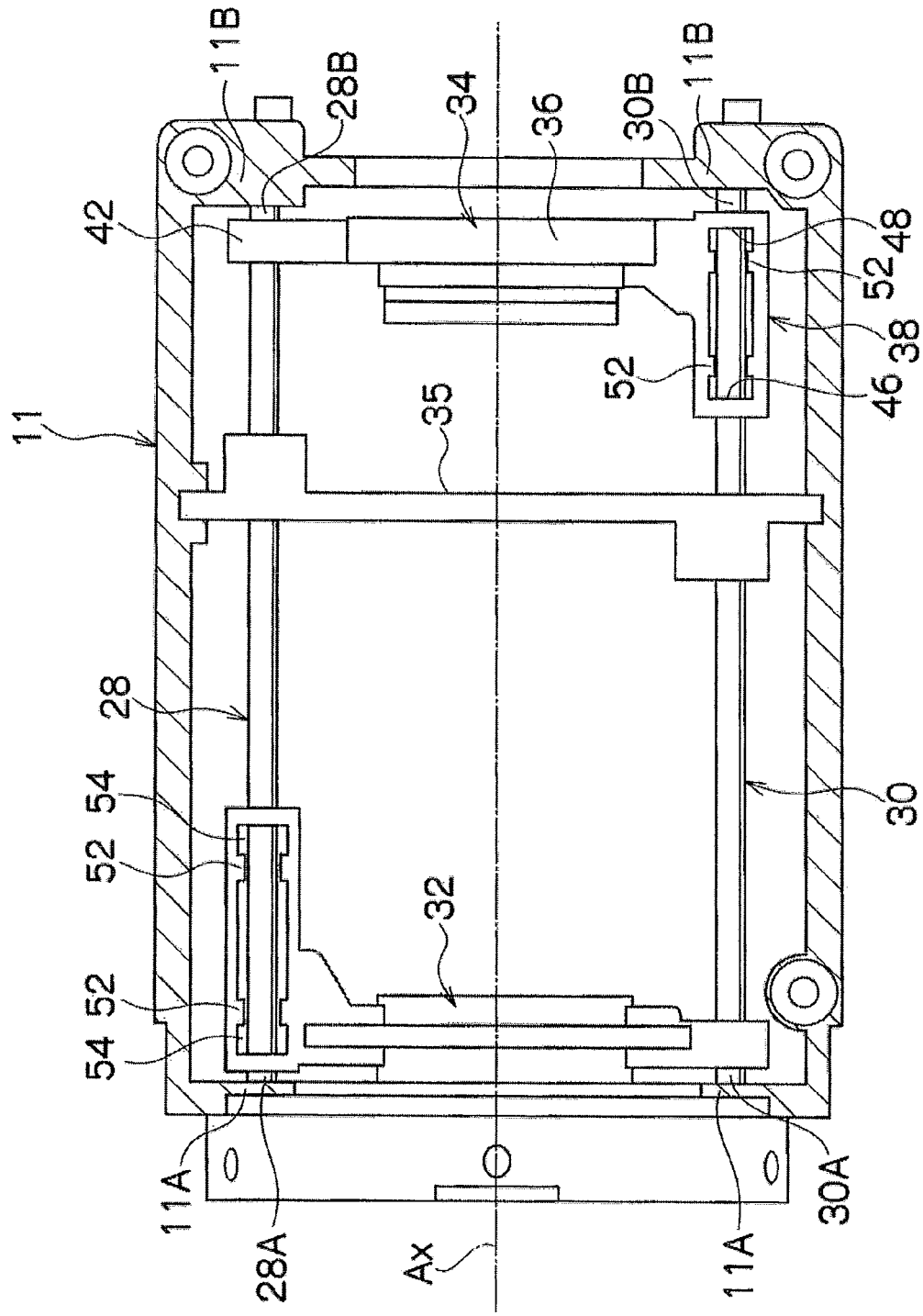
FIG. 2 is a cross-sectional view illustrating the structure of the lens device shown in FIG. 1.

As shown in FIG. 2, a pair of guide bars 28 and 30 are inserted into the lens barrel body 11 so as to be parallel to an optical axis Ax. The guide bar 28 has a leading end portion 28A that is fixed to a flange portion 11A formed on the front surface of the lens barrel body 11 and a rear end portion 28B that is fixed to a flange portion 11B formed on the rear surface of the lens barrel body 11. Similarly, the guide bar 30 has a leading end portion 30A that is fixed to the flange portion 11A and a rear end portion 30B that is fixed to the flange portion 11B. A lens moving frame (a lens moving frame according to this embodiment) 32 of the second lens group 14 and a lens moving frame (a lens moving frame according to this embodiment) 34 of the fourth lens group 18 are slidably supported by the guide bars 28 and 30, respectively. The lens moving frames 32 and 34 will be described below.

A nut (not shown) forming a screw feeding device is provided in the lens moving frame 32, and a feed screw (not shown) forming the screw feeding device is fitted into the nut. The feed screw is provided in parallel to the optical axis Ax, and the end of the feed screw is connected to an output shaft of a zooming stepping motor (not shown). When a zoom signal is output from a camera body to a zoom driver circuit (not shown) of the zooming stepping motor, the zooming stepping motor rotates the feed screw in a direction corresponding to the signal. Then, the lens moving frame 32 is moved forward and backward along the guide bars 28 and 30 in the optical axis direction to adjust a focal length to a desired value.

Similarly, a nut (not shown) forming a screw feeding device is provided in the lens moving frame 34, and a feed screw (not shown) forming the screw feeding device is fitted into the nut. The feed screw is provided in parallel to the optical axis, and the end of the feed screw is connected to an output shaft of a focusing stepping motor (not shown). When a focus signal is output from the camera body to a focus driver circuit (not shown) of the focusing stepping motor, the focusing stepping motor rotates the feed screw in a direction corresponding to the signal. Then, the lens moving frame 34 is moved forward and backward along the guide bars 28 and 30 in the optical axis direction to perform focusing.

The third lens group 16, which is a relay lens, is fixed to the lens barrel body 11. That is, the third lens group 16 is held by a lens holding frame 35, and the lens holding frame 35 is fitted and fixed to the lens barrel body 11.

Figure 3:
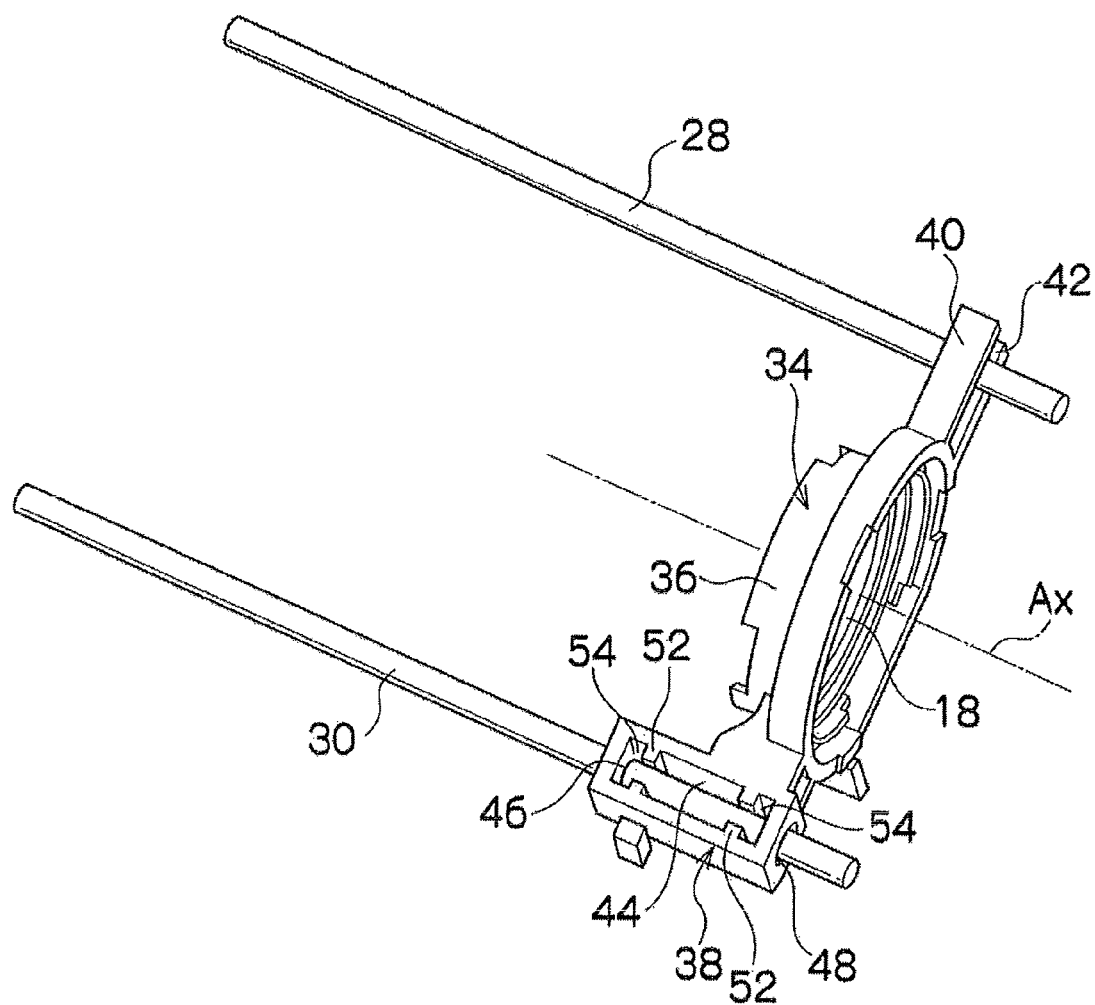
FIG. 3 is a perspective view illustrating the lens moving frame according to the embodiment.

FIG. 3 shows the lens moving frame 34 holding the fourth lens group (which is referred to as a focusing lens for convenience) 18 that is supported so as to be movable along the guide bars 28 and 30 in the direction of the imaging optical axis Ax. The lens moving frame 34 is a resin molded product made of a black resin material having a light shielding property, and is manufactured by, for example, injection molding. The structure of the lens moving frame 32 shown in FIG. 2 is the same as that of the lens moving frame 34. Therefore, in this embodiment, the lens moving frame 34 is described, but a description of the lens moving frame 32 is omitted.

As shown in FIG. 3, the lens moving frame 34 includes a ring-shaped holding portion 36 that holds the fourth lens group 18, a holder portion 38 to which the guide bar 30 is fitted, and a projecting portion 40 to which the guide bar 28 is fitted, which are integrally formed with each other. A groove 42 is formed in the projecting portion 40, and the guide bar 28 is inserted into the groove 42.

The holder portion 38 of the lens moving frame 34 includes a gap portion 44 that has a rectangular shape in plan view and extends in the direction of the imaging optical axis Ax. A guide hole 46 is formed at the leading end of the gap portion, and a guide hole 48 is formed at the rear end thereof. The guide bar 30 is inserted into the guide holes 46 and 48. Therefore, the guide holes 46 and 48 are formed such that their central axes are aligned with each other and the aligned central axis is parallel to the imaging optical axis Ax.

Figure 4:
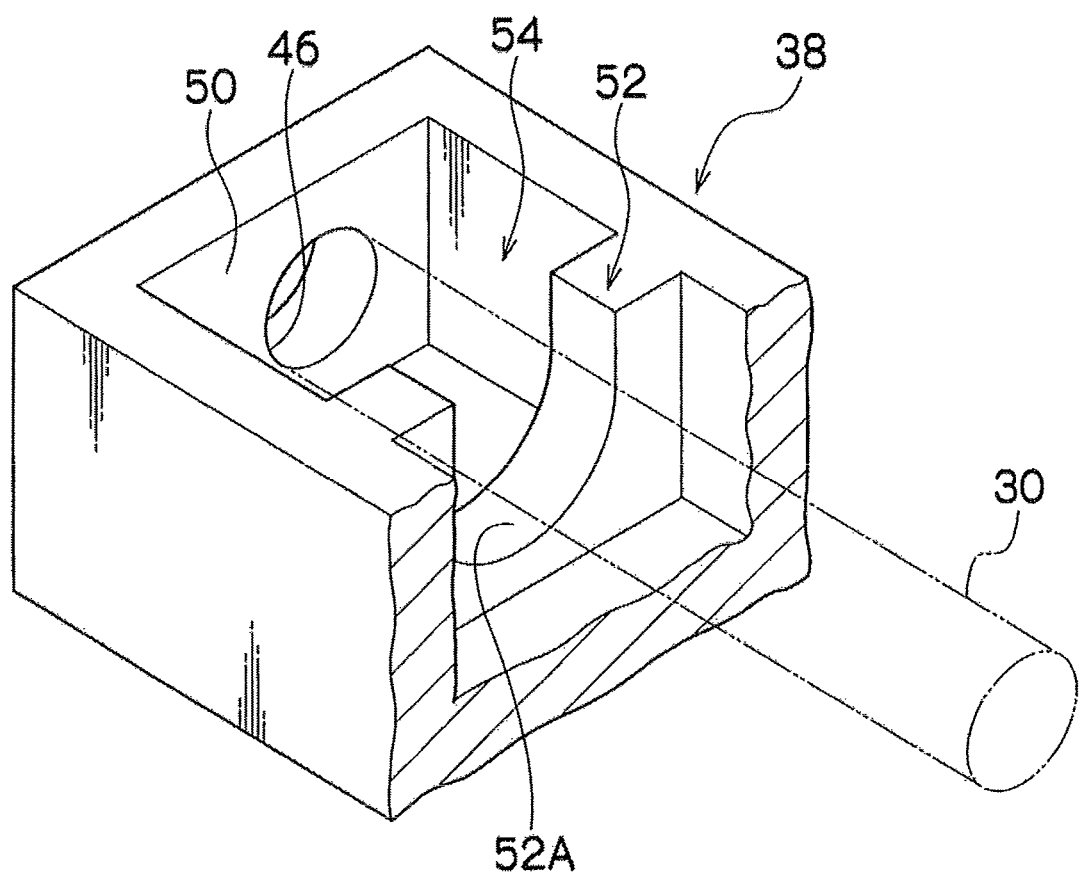
FIG. 4 is a cross-sectional perspective view illustrating the structure of a main part of the lens moving frame shown in FIG. 3.

As shown in FIG. 4, the holder portion 38 includes partition walls 52 through which the guide bar 30 is inserted and which are provided near wall portions 50 (a wall portion having the guide hole 48 formed therein is not shown) having the guide holes 46 and 48 formed therein. A lubricant reservoir portion 54 having a lubricant filled and stored therein is formed between the partition wall 52 and the wall portion 50.

Next, the characteristics of the lens moving frame 34 according to this embodiment will be described.

According to the lens moving frame 34 of this embodiment, the lubricant stored in the lubricant reservoir portion 54 is adhered to the guide bar 30 disposed between the partition wall 52 and the wall portion 50. When the lens moving frame 34 is moved along the guide bar 30, any extra lubricant is scraped off from the guide bar by the guide holes 46 and 48 and the opening portion formed in the partition wall 52 and then stored in the lubricant reservoir portions 54. The amount of lubricant required to smoothly move the lens moving frame 34 is adhered to the guide bar 30, and the lens moving frame 34 is smoothly moved along the guide bar 30. As such, the lubricant reservoir portion 54 formed in the lens moving frame 34 makes it possible to effectively use the lubricant and reduce the amount of lubricant used.

As described above, in the lens moving frame 34 according to this embodiment, the lubrication maintenance depends on the amount of lubricant stored in the lubricant reservoir portion 54. Therefore, it is possible to ensure the slidability of the lens moving frame 34 for a long time, as compared to the lens moving frame disclosed in JP-A-2003-344746 in which a lubricant is merely applied onto the guide bar 30. In addition, since an appropriate amount of lubricant is stored in the lubricant reservoir portion 54, it is possible to prevent an increase in manufacturing costs, and lubricant scattering does not occur.

Therefore, according to the lens moving frame 34, it is possible to ensure slidability for a long time without a use of a large amount of lubricant. In addition, the position accuracy of the lens moving frame 34 is ensured by the guide holes 46 and 48 and the guide bar 30 fitted into the guide holes 46 and 48. When the opening portion of the partition wall 52 comes into contact with the guide bar 30, the position accuracy is likely to be lowered, which is not preferable. Therefore, it is preferable that there be a little gap between the opening portion of the partition wall 52 and the guide bar 30.

The partition wall 52 may be formed integrally with or separately from the holder portion 38. It is preferable that the partition wall 52 and the holder portion 38 be integrally made of a resin material in order to reduce manufacturing costs. In addition, when the partition wall 52 is formed separately from the holder portion 38, it is preferable that a separate partition wall 52 be provided in the gap portion 44 of the holder portion 38 in order to improve an assembly operation.

Figure 5:
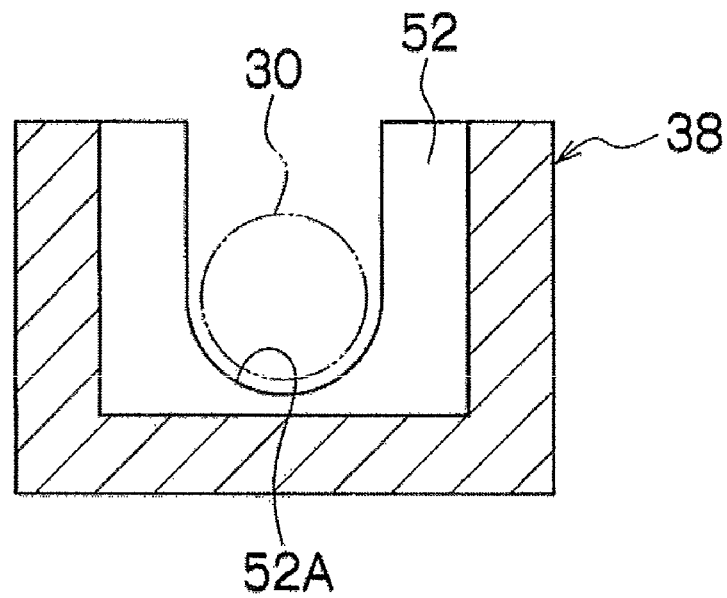
FIG. 5 is a cross-sectional view illustrating the structure of the main part of the lens moving frame shown in FIG. 3.

As shown in FIG. 5, it is preferable that the partition wall 52 be formed in a U-shape in a cross-sectional view (FIG. 5 is not a cross-sectional view, but the cross section has a U-shape in a longitudinal cross-sectional view) and the guide bar 30 be inserted into a concave portion 52A of the U-shaped partition wall 52.

Figure 6:
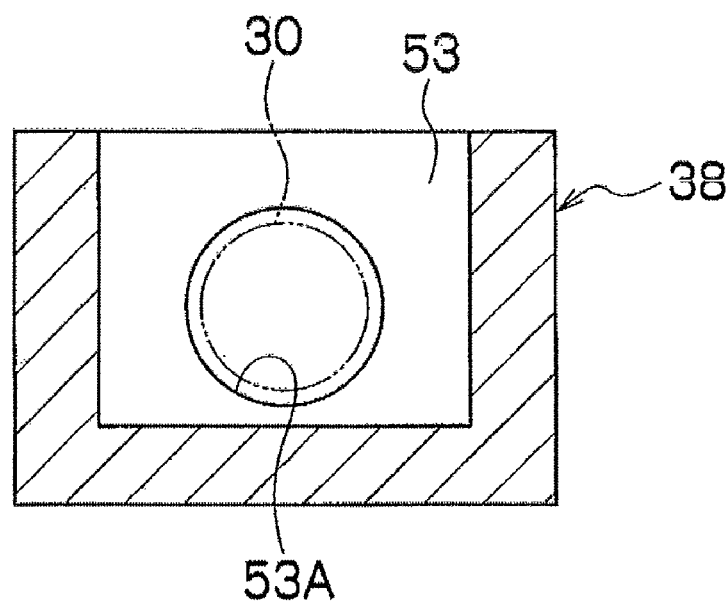
FIG. 6 is a cross-sectional view illustrating the structure of a main part of a lens moving frame according to another embodiment of the invention.

The shape of the partition wall 52 in a cross-sectional view is not limited to the U-shape shown in FIG. 5. For example, as shown in FIG. 6, a partition wall 53 may be formed in a plate shape having an opening 53A therein and the guide bar 30 may be inserted into the opening 53A of the plate-shaped partition wall 53.

The characteristics of the lens moving frame 34 have been described above, and the lens moving frame 32 has the same characteristics as the lens moving frame 34.

That is, in the lens moving frame 32 shown in FIG. 2, reference numeral 52 denotes a partition wall, and reference numeral 54 denotes a lubricant reservoir portion. In addition, the lens moving frame 32 is movably supported by the guide bar 28.

Further, grease having high viscosity may be used as the lubricant according to the above-described embodiment.

What is claimed is:

1. A lens moving frame that is supported so as to be movable along a guide bar in an imaging optical axis direction, comprising:
   a holding portion that holds a lens;
   guide holes through which the guide bar is inserted;
   wall portions having the guide holes formed therein;
   partition walls through which the guide bar is inserted and which are provided near the corresponding wall portions, at least one of the partition walls being substantially parallel to at least one of the wall portions; and
   lubricant reservoir portions that are formed between the partition walls and the wall portions and have a lubricant stored therein.

2. The lens moving frame according to claim 1, wherein the partition walls are formed integrally with or separately from the lens moving frame.

3. The lens moving frame according to claim 1, wherein the partition wall has a U-shape in a cross-sectional view, and the guide bar is inserted into a concave portion of the U-shaped partition wall.

4. The lens moving frame according to claim 1, wherein the partition wall is formed in a plate shape having an opening therein, and the guide bar is inserted into the opening of the plate-shaped partition wall.

5. A lens device comprising the lens moving frame according to claim 1.

* * * * *